US007690779B2

(12) United States Patent
Spehrley, Jr. et al.

(10) Patent No.: US 7,690,779 B2
(45) Date of Patent: Apr. 6, 2010

(54) HIGH RESOLUTION MULTICOLOR INK JET PRINTER

(75) Inventors: Charles W. Spehrley, Jr., Keene, NH (US); Paul A. Hoisington, Norwich, VT (US)

(73) Assignee: Fujifilm Dimatix, Inc., Lebanon, NH (US)

( * ) Notice: Subject to any disclaimer, the term of this patent is extended or adjusted under 35 U.S.C. 154(b) by 338 days.

(21) Appl. No.: 11/765,890

(22) Filed: Jun. 20, 2007

(65) Prior Publication Data

US 2008/0018682 A1 Jan. 24, 2008

Related U.S. Application Data

(63) Continuation of application No. 08/432,783, filed on May 2, 1995, now Pat. No. 7,237,872.

(51) Int. Cl.
*G01D 11/00* (2006.01)

(52) U.S. Cl. .......................................... 347/99; 347/88

(58) Field of Classification Search .................. 347/88, 347/99; 106/31.13
See application file for complete search history.

(56) References Cited

U.S. PATENT DOCUMENTS 3,008,372 A 11/1961 Wiley et al.
3,438,057 A 4/1969 Neitzel
3,512,158 A 5/1970 Scarborough
3,952,311 A 4/1976 Lapeyre
4,009,332 A 2/1977 Van Hook
4,401,991 A 8/1983 Martin
4,525,428 A * 6/1985 Matsushita et al. ....... 428/32.73
4,533,923 A 8/1985 Suzuki
4,538,160 A 8/1985 Uchiyama
4,672,432 A 6/1987 Sakurada et al.
4,673,951 A 6/1987 Mutoh et al.

(Continued)

FOREIGN PATENT DOCUMENTS

DE 3122645 12/1982

(Continued)

OTHER PUBLICATIONS

Patent Abstracts of Japan, vol. 007, No. 014 (M-189), Jan. 29, 1983 & JP 57 178783 A (Cannon KK), Nov. 4, 1982.

(Continued)

*Primary Examiner*—Thinh H Nguyen
(74) *Attorney, Agent, or Firm*—Fish & Richardson P.C.

(57) ABSTRACT

A high-resolution ink jet printer includes a drum supported for rotation about an axis, substrate positioning means for positioning a substrate sheet on the surface of the drum to receive a printed image, carriage means movable parallel to the drum axis, printhead means supported on the carriage means and having at least one array of orifices disposed in spaced relation to the surface of the drum for projecting ink drops onto a substrate sheet carried by the drum, drive means for driving the carriage parallel to the axis of the drum, encoder means providing a train of signals at a rate dependent upon the rate of rotation of the drum, and control means for controlling the projection of the ink drops from the printhead means at a rate that depends on the rate of signals received by the control means.

20 Claims, 6 Drawing Sheets

U.S. PATENT DOCUMENTS

| | | | | |
|---|---|---|---|---|
| 4,686,538 | A | 8/1987 | Kouzato | |
| 4,751,528 | A | 6/1988 | Spehrley, Jr. et al. | |
| 4,860,026 | A | 8/1989 | Matsumoto et al. | |
| 4,873,134 | A | 10/1989 | Fulton et al. | |
| 4,880,324 | A | 11/1989 | Sato et al. | |
| 4,920,355 | A | 4/1990 | Katerberg | |
| 4,951,067 | A | 8/1990 | Spehrley, Jr. | |
| 4,959,659 | A | 9/1990 | Sasaki et al. | |
| 4,971,408 | A | 11/1990 | Hoisington et al. | |
| 4,978,971 | A | 12/1990 | Goetz et al. | |
| 5,023,111 | A | 6/1991 | Fulton et al. | |
| 5,043,741 | A | 8/1991 | Spehrley et al. | |
| 5,105,204 | A | 4/1992 | Hoisington et al. | |
| 5,114,747 | A | 5/1992 | Fulton et al. | |
| 5,140,339 | A | 8/1992 | Higuma et al. | |
| 5,142,374 | A | 8/1992 | Tajika et al. | |
| 5,281,442 | A | 1/1994 | Fulton et al. | |
| 5,337,079 | A | 8/1994 | Spehrley, Jr. et al. | |
| 5,372,852 | A | 12/1994 | Titterington et al. | |
| 5,402,156 | A | 3/1995 | Donahue et al. | |
| 5,406,392 | A | 4/1995 | Aoki et al. | |
| 5,450,111 | A | 9/1995 | Mutoh | |
| 5,485,183 | A | 1/1996 | Zandian et al. | |
| 5,568,173 | A | 10/1996 | Leenders et al. | |
| 5,574,078 | A * | 11/1996 | Elwakil | 523/161 |
| 5,625,397 | A | 4/1997 | Allred et al. | |
| 5,825,377 | A | 10/1998 | Gotoh et al. | |
| 5,980,981 | A | 11/1999 | Fulton et al. | |
| 5,984,449 | A | 11/1999 | Tajika et al. | |
| 6,109,720 | A | 8/2000 | Gotoh et al. | |
| 6,113,210 | A | 9/2000 | Gotoh et al. | |
| 7,237,872 | B1 | 7/2007 | Spehrley, Jr. et al. | |

FOREIGN PATENT DOCUMENTS

| | | |
|---|---|---|
| DE | 3300447 | 7/1984 |
| DE | 4021227 | 6/1991 |
| EP | 0497614 | 8/1992 |
| EP | 0540987 | 5/1993 |
| EP | 0568272 | 11/1993 |
| EP | 0589669 | 3/1994 |
| EP | 0610096 | 7/2002 |
| GB | 1201624 | 8/1970 |
| JP | 5616467 | 2/1981 |
| JP | 5644259 | 4/1981 |
| JP | 58072461 | 4/1983 |
| JP | 5970582 | 4/1984 |
| JP | 61108255 | 5/1986 |
| JP | 62180839 | 8/1987 |
| JP | 6321167 | 1/1988 |
| JP | 63205241 | 8/1988 |
| JP | 63183866 | 9/1988 |
| JP | 63315285 | 12/1988 |
| JP | 6455248 | 3/1989 |
| JP | 1228859 | 9/1989 |
| JP | 1285359 | 11/1989 |
| JP | 2500583 | 3/1990 |
| JP | 2286250 | 11/1990 |
| JP | 35161 | 1/1991 |
| JP | 356186 | 3/1991 |
| JP | 3218851 | 9/1991 |
| JP | 3288674 | 12/1991 |
| JP | 4140148 | 4/1992 |
| JP | 4201263 | 7/1992 |
| JP | 516367 | 1/1993 |
| JP | 6109096 | 4/1994 |
| JP | 6115079 | 4/1994 |
| JP | 6312519 | 11/1994 |
| WO | WO 89/12215 | 12/1989 |

OTHER PUBLICATIONS

Patent Abstracts of Japan, vol. 008, No. 180 (M-318), Aug. 18, 1984 and JP 59 070583 A (Toray KK), Apr. 21, 1984.
Patent Abstracts of Japan, vol. 014, No. 209 (M-0968), Apr. 27, 1990 and JP 02 047075 A (Minolta Camera Co Ltd), Feb. 16, 1990.
Patent Abstracts of Japan, vol. 013, No. 100 (M-805), Mar. 9, 1989 & JP 63 288769 A (NEC Corp), Nov. 25, 1988.
Supplementary Partial European Search Report (EPO Form 1503) for Application No. EP 96 91 3907 dated Jun. 20, 1997.

* cited by examiner

HIGH RESOLUTION MULTICOLOR INK JET PRINTER

RELATED APPLICATIONS

Pursuant to 35 USC 120, this application claims the benefit of the priority date of U.S. patent application Ser. No. 08/423,783, filed May 2, 1995, the contents of which are herein incorporated by reference.

BACKGROUND OF THE INVENTION

This invention relates to high resolution multicolor ink jet printers and, more particularly, to a high resolution printer providing continuous tone color image characteristics.

In many instances, as for example in proofing systems for digital color pre-press operations, it is important to verify the integrity of digitally created color images prior to the production of film or plate images to assure the faithfulness of the image to be reproduced in the printed product. While such pre-proofing systems have been utilized previously with other printing techniques, the provision of an ink jet pre-proofing system has unique advantages in processing simplicity, high resolution and digital image control.

In high resolution ink jet systems i.e., those having about 235 or more dots/cm, drop placement errors which degrade image quality can be produced in many ways. For example, the position of an individual ink drop projected from a selected ink jet orifice in the printhead with respect to the intended location of the ink drop may be subject to errors in either the main scanning of the subscanning direction resulting from misplacement of the head itself or an incorrect angular orientation of the arrays of orifices in the printhead, or from variations in the spacing between the ink jet head and the substrate toward which the ink drops are projected. The effect of such errors on the visual appearance of a printed image depends upon the spacing of the drop from adjacent ink drops in the image and the density and color differences between the adjacent drops or image segments. For high quality images the result of such errors should be below the limit of visual detectability.

Ink jet systems have the disadvantage that variations in tone, or density level, of an image pixel, which are effected in the graphic arts by varying the physical size of each image element, are difficult to achieve in the same manner. Although it is possible, as described for example in the Sakurada et. al. U.S. Pat. No. 4,672,432 and the Kouzato U.S. Pat. No. 4,686,538, to vary the effective area of each pixel by varying number of ink jet dots provided in a matrix corresponding to the image pixel and thereby vary the pixel density, for high resolution systems such arrangements would require extremely small drop size and complex drop positioning control systems in order to achieve the desired result. Similarly, arrangements for controlling pixel density by varying the overlap of adjacent dots produced by ink jet drops, as described, for example, in the Saito et. al. U.S. Pat. No. 4,692,773 involve complex selective drop placement techniques. For multicolor images, moreover, two or more subtractive color ink drops must be precisely positioned at the same location in order to provide the desired hue.

SUMMARY OF THE INVENTION

Accordingly, it is an object of the present invention to provide a multicolor ink jet printing system providing high resolution and continuous tone characteristics in a printed image in a simple and effective manner.

Another object of the invention is to provide an ink jet system capable of providing high resolution multicolor proofs for pre-press proofing operations.

These and other objects of the invention are attained by providing an ink jet printer arranged to print images using inks of at least two different density levels for two subtractive colors and for black. Preferably only a high density yellow ink is used and another ink of a different color or black ink of a third density level is utilized. In a preferred embodiment, the printer has a rotating drum carrying a substrate on which an image is to be printed along with at least one printhead mounted on a carriage for continuous scanning in a direction parallel to the drum axis for projecting ink drops onto the substrate as the drum rotates. Preferably two printheads are mounted on the carriage, one for projecting the high density ink drops and the other for projecting the lower density ink drops.

In order to control the ejection of ink drops from the printhead, an encoder coupled to the drum generates output signals at a rate corresponding to the ink drop ejection rate required to produce the desired high resolution ink drop spacing on the substrate in the direction of drum rotation. To control the ink drop spacing in the direction of printhead motion, the carriage is driven by a lead screw thread having an appropriate pitch and the array of orifices in the printhead is oriented at an appropriate angle to the direction of printhead motion, called the sabre angle, which is dependent upon the spacing of the ink jet orifices in the printhead to provide the desired high resolution ink drop spacing. When two printheads are mounted on the carriage, the spacing between the printheads and the sabre angles of the printheads are adjusted so as to assure accurate registration of drops ejected from one printhead with drops ejected from the other printhead.

Preferably, the printer uses hot melt inks and, in order to control the extent of the spreading of ink drops deposited on a substrate prior to solidification so as to assure uniform ink dot size, the surface of the drum, which is made of a heat-conductive material such as aluminum, is heated by a closely spaced heat source which is controlled in accordance with the detected temperature of the drum surface. Temperature uniformity is facilitated by enclosing the printer drum in a temperature controlled environment such as a housing section having a temperature-controlled exhaust fan.

In addition, the printer has a sheet feed system by which a substrate sheet, such as paper or polyester film or even a thin aluminum plate, is fed to a set of lead edge grippers which clamp the lead edge of the sheet to the drum. The drum also has a set of tail edge grippers which clamp the tail edge of the sheet to hold the sheet securely against the drum surface during printing. Prior to printing, the sheet is conditioned to drum temperature while the drum is accelerated to printing speed. After an image has been printed on the sheet, the lead edge of the sheet is released and stripped away from the drum surface toward soft rubber pinch rolls which convey the sheet toward an output tray without damaging the image, the tail edge of the sheet being released before it reaches the strippers.

To minimize the visual effect of drop positioning errors from various sources, printing is effected in an interlaced pattern in which the printhead orifices in each color orifice array which may print a given color during any given drum rotation are spaced by a number of image pixels which is selected so that there is no common divisor for that number and for the total number of orifices for that color in the array of printhead orifices.

BRIEF DESCRIPTION OF THE DRAWINGS

Further objects and advantages the invention will be apparent from a reading of the following description in conjunction with the accompanying drawings in which.

DESCRIPTION OF PREFERRED EMBODIMENTS

Figure 2:
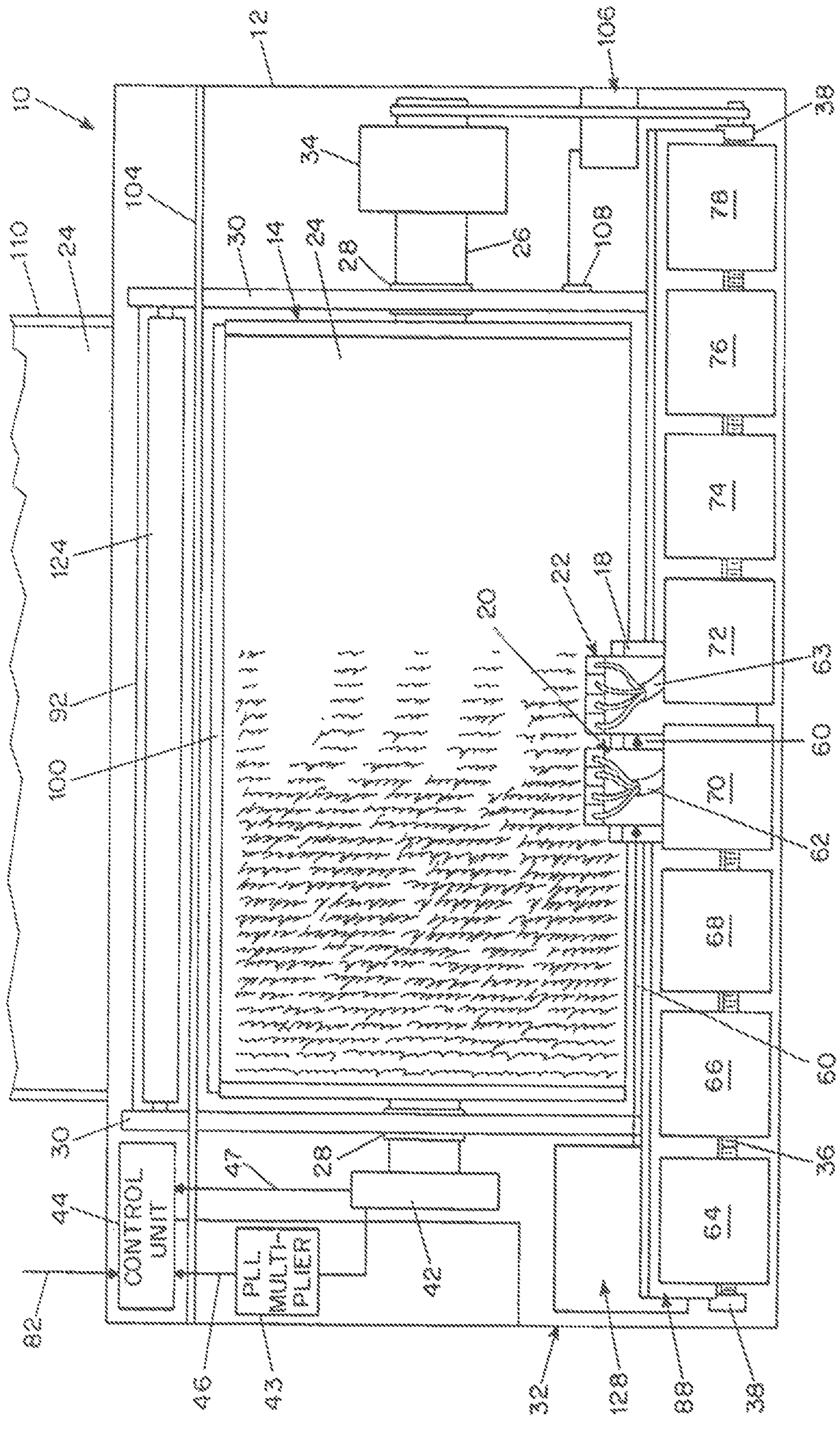
FIG. 2 is a schematic plan view of the embodiment of the invention illustrated in FIG. 1.
Figure 4:
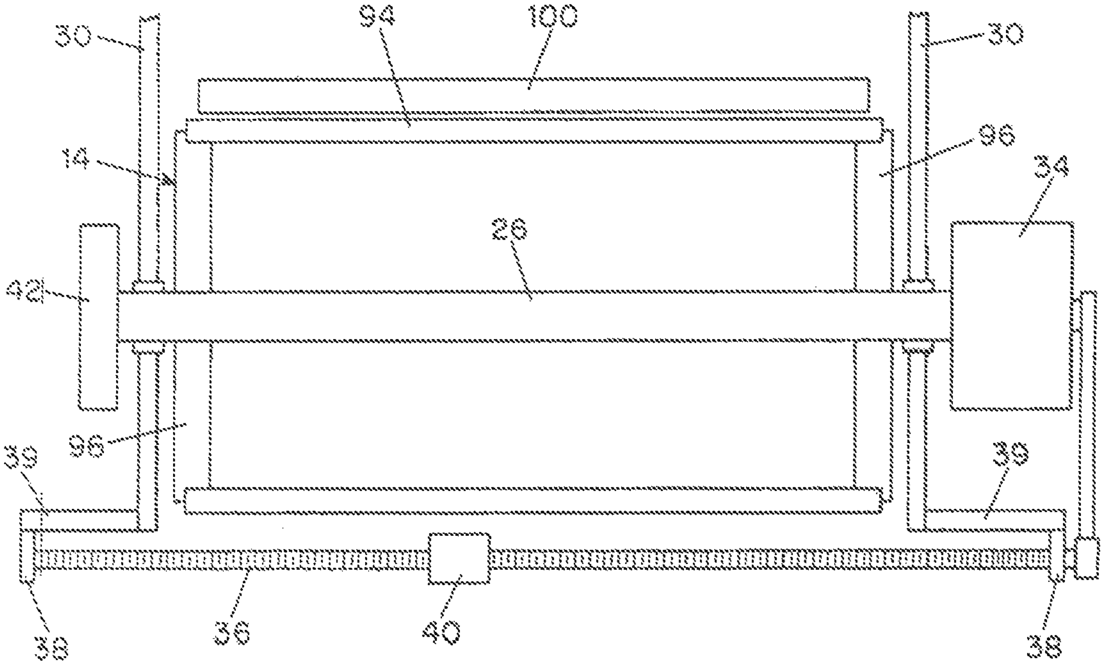
FIG. 4 is a view in longitudinal section illustrating the printing drum in the embodiment of FIG. 1.

In the representative embodiment of the invention shown in the drawings, a printer 10 includes a housing 12 enclosing a drum 14 which is supported for rotation in the direction indicated by the arrow 16 and a carriage 18 supporting a spaced pair of ink jet printheads 20 and 22 which are arranged to eject ink drops selectively onto a substrate sheet 24 carried by the drum 14. As best seen in FIGS. 2 and 4, the drum 14 has an axial drive shaft 26 which is supported at opposite ends in bearings 28 in two support plates 30 which are rigidly supported on a base plate 32. A drive motor 34 is coupled to one end of the drum drive shaft 26 and also to a lead screw 36 which is supported at opposite ends in bearings 38 supported by brackets 39 (FIG. 4) from the support plates 30. To reduce positional errors in the axial direction of the drum, both the drum drive shaft 26 and the lead screw 36 are biased toward the right end of the support plate 30, as seen in FIG. 2, by spring washers (not shown.)

Figure 3:
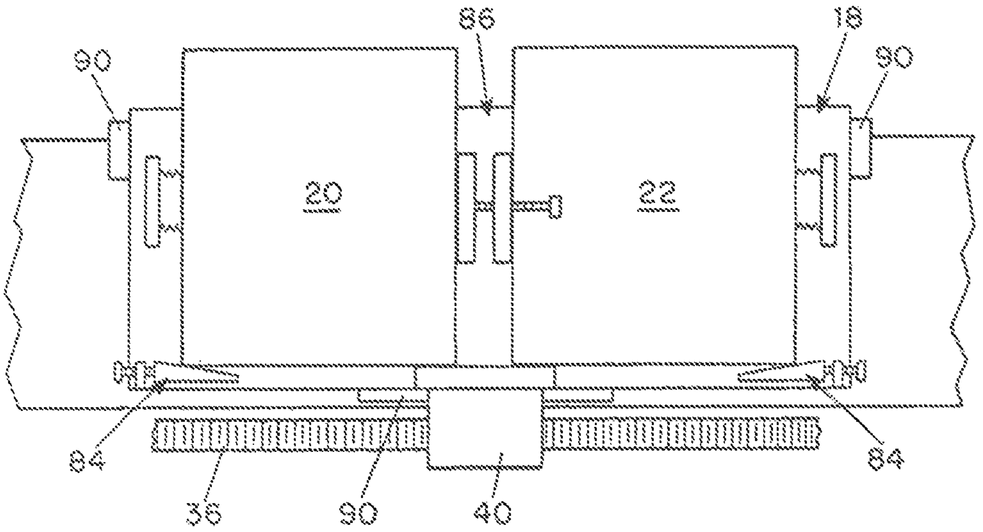
FIG. 3 is a fragmentary front view showing the arrangement of the printhead carriage in the embodiment of FIG. 2.

As shown in FIG. 3, the lead screw 36 passes through a nut 40 affixed to the carriage 18 supporting the printheads 20 and 22 and the pitch of the lead screw 36 is selected so as to drive the carriage parallel to the drum axis by a predetermined distance during each rotation of the drum 14. The lead screw 36 is a KERK rolled lead screw designed for high accuracy of the thread pitch throughout its length and has a high stiffness and the nut 40 is a KERK ZBX plastic antibacklash nut. At the opposite end of the drum, the drive shaft 26 is coupled to an encoder 42 which encodes each position on the drum and thus generates a train of electrical pulses at a rate which is dependent on the rate of rotation of the drum 14, such as 1000 pulses per drum rotation.

Because a pulse rate of 1000 per drum revolution corresponds to about 20/cm on the circumference of a drum having a diameter of about 16 cm, which would not provide high image resolution, the encoder signals are supplied to a multiplier unit 43, which preferably includes a phase-locked loop (PLL) multiplier and generates ink drop ejection actuation signals for the printheads 20 and 22 at an increased rate which is directly related to the encoder output signals and therefore to the speed of rotation of the drum 14, for example, 13,000 pulses per drum rotation and supplies them to a control unit 44 though a line 46. In this way, the necessary pulse rate for high resolution images is obtained without requiring a high resolution encoder, which is an order of magnitude more expensive than an encoder, such as a Hewlett-Packard HEDS 5540 encoder, producing 1000 pulses per revolution. Both the low resolution encoder 42 and the PLL multiplier unit 43 together cost only a small fraction of the cost of a high resolution encoder producing, for example, 13,000 pulses per revolution. Moreover, the encoder may also be used to control the drum speed during acceleration and deceleration as well as during continuous running when the output is supplied directly through a line 47 to the servocontroller (not shown) in the control unit 44 for the drum drive motor 34, while the PLL multiplier 43 supplies high frequency pulses to control the drop ejection rate.

Figure 5:
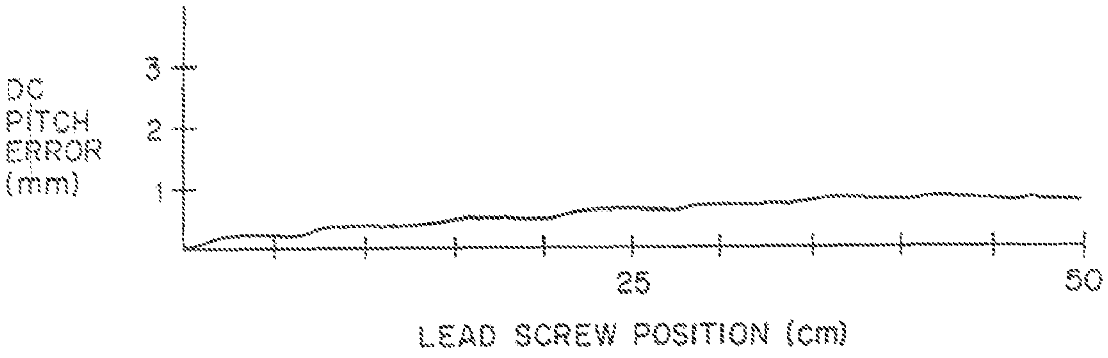
FIG. 5 is a graphical illustration showing the effect of a long term variation of screw pitch for a lead screw.

One of the most significant potential sources of drop position error in a rotating drum type ink jet printer is the lead screw 36 which positions the printheads 20 and 22 in the axial direction during printing. It is generally understood that a cumulative DC pitch error may occur in the manufacture of a lead screw in the manner shown in FIG. 5. This may amount to about one part in 500, i.e., about one millimeter over the length of a drum 50 cm long. For adjacent image segments produced by 40-orifice arrays which are about 1.7 mm. long the positioning error between adjacent drops resulting from DC pitch error is only about 0.003 mm, which is not visually detectable.

Figure 6:
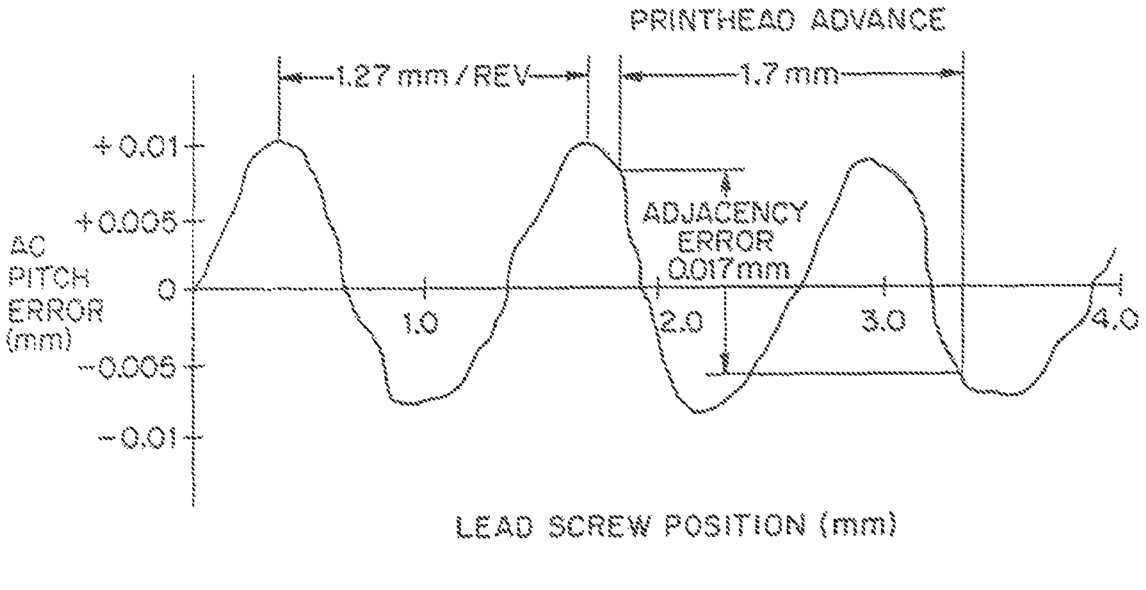
FIG. 6 is a graphical illustration showing the effect of a cyclical variation of screw pitch in a lead screw.

On the other hand, it is not generally recognized that a cyclical or AC lead pitch error, i.e., one which occurs cyclically during each revolution of the lead screw, although very small, may seriously affect image quality. This type of error is shown in FIG. 6, which indicates a typical error of 0.02 mm peak-to-peak in pitch variation during each rotation of the screw thread which advances the printhead by 1.27 mm. To avoid visual detection of drop placement errors resulting from such AC lead screw variations, the lead screw must be at the same angular position for each drum angle position during every drum rotation. In other words, the lead screw must rotate at the same rate or an integral multiple of the drum rotation but may not rotate at a lower rate. Otherwise the drop position errors resulting from AC lead screw variation will not cancel out in adjacent image pixels and could, in fact, be additive. With a resolution of 235 dots/cm and arrays of 40 orifices for each color, the carriage 18 must advance 1.7 mm during each drum revolution so that, for a 1:1 relation between the lead screw and drum rotations, the lead screw pitch must be 1.7 mm.

Figure 7:
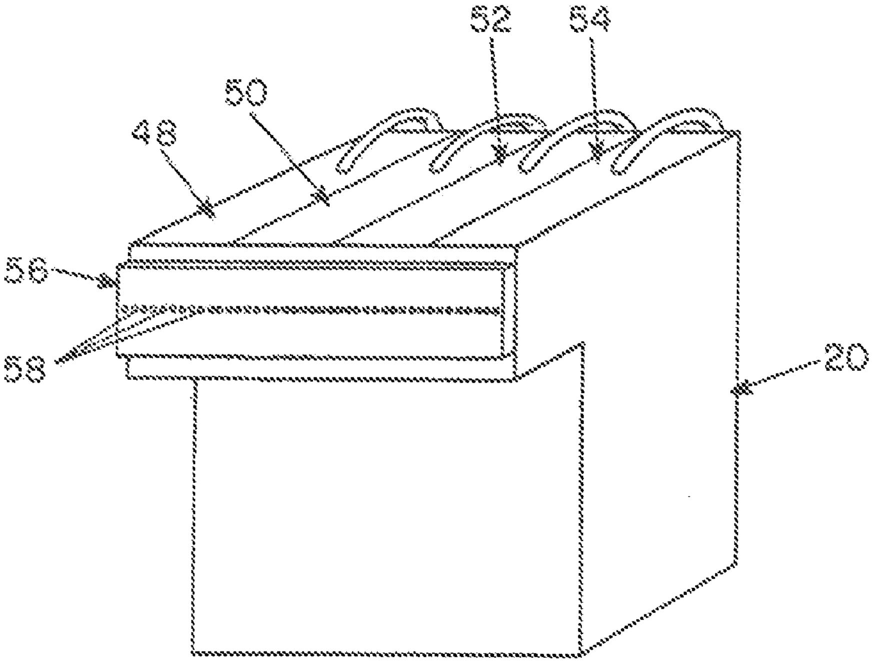
FIG. 7 is a perspective view showing a typical printhead of the type used in the embodiment shown in FIG. 1.

Each of the printheads 20 and 22 has the same structure, which is illustrated schematically in FIG. 7 for the printhead 20. As shown in FIG. 7 the printhead 20 has four ink reservoirs 48, 50, 52 and 54. Each reservoir supplies a different ink for selective ejection from a corresponding array of 40 orifices in an orifice plate 56 which is mounted at the side of the printhead facing the substrate sheet 24. Since there are 40 orifices in the array supplied by each reservoir, the orifice plate 56 contains a total of 160 orifices 58 in a straight line. The printhead 20 includes a conventional piezoelectric drop ejection arrangement for each of the orifices 58 whereby ink supplied from a corresponding reservoir is selectively ejected through the orifice as a drop at the appropriate time in response to a signal received through a line 60 from the control unit 44. In addition, each of the ink reservoirs 48-54 in the printhead 20 is replenished periodically though a corresponding conduit in a flexible ink supply line 62 from one of series of corresponding remote stationary reservoirs 64, 66, 68 and 70 provided in the housing 12. A similar set of stationary reservoirs 72, 74, 76 and 78 is also connected through conduits in a supply line 63 to corresponding reservoirs in the printhead 22 and that printhead likewise receives signals from the line 60 to control the ejection of ink drops from the orifices therein. As is evident from FIGS. 1 and 2, the stationary reservoirs 64-78 are readily accessible to the operator of the system to permit replenishment of the ink as needed. The supply lines 62 and 63 may also include a vacuum conduit by which subatomospheric pressure may be supplied to the printheads 20 and 22 for deaeration of the ink as described, for example, in the Hine et. al. U.S. Pat. No. 4,940,995, the disclosure of which is incorporated herein by reference. In addition, if hot melt ink is used, the stationary reservoirs 64-78 are heated to a temperature above the melting point of the inks therein and each ink conduit in the lines 62 and 63 may include a heater wire in order to melt the ink in the conduit during refill of a printhead reservoir from the corresponding stationary reservoir as described, for example, in the Hoisington et. al. U.S. Pat. No. 4,814,786.

In order to generate a desired image on the substrate sheet 24, digital signals representing the image information in terms of color and density of each pixel are supplied through an input line 82 to the control unit 44. The control unit converts these signals in a conventional manner to produce selective ink drop ejection actuation signals timed for operation of the piezoelectric actuators in the ink jet heads 20 and 22 at the appropriate times to eject ink drops of appropriate color and density for deposition at predetermined locations on the substrate sheet 24 as the drum 14 is rotated and the printheads 20 and 22 are advanced parallel to the axis of the drum by rotation of the lead screw 36.

To provide a high-quality, high-resolution image with continuous tone characteristics it is necessary to be able to produce a continuously variable tonal range which appears to go down to a density of a few percent without causing individual pixel spots to be visually observable. In continuous tone images, fewer than all possible drop locations are printed to create less than full density. With full density spots, the image can become grainy in appearance if the individual spots are visible. The visibility of the spots depends on their absorptivity and spacing as shown in the Banderly curve in FIG. 9.

For a low absorption ink, such as yellow, even the most sensitive spatial period (0.25 cm) may be printed without observable graininess. For a high absorption ink such as black, the graininess is generally visible at a spatial period of about 0.02 cm. For 235 spots/cm, this will occur when 5 to 10% of the drops are printed. Such graininess can be avoided by adding a low density ink which produces the desired image density with full coverage of the low density ink.

This low density ink may then be used to produce further reduced density images by printing fewer drops, as with the high density ink. Because the ink is low density, it may be possible to get past the minimum point on the Banderly curve without a grainy image. If not, a third, even less dense, ink may be employed, and if this produces a grainy image at some spot separation, then a fourth, lower density ink could be employed.

At a resolution of 235 spots/cm, one density of yellow, two density levels of cyan and magenta and three density levels of black ink produce high image quality. At half this resolution, a single density of yellow is employed but the other colors would require double the number of low density shades. Therefore, printing higher resolution images greatly reduces the number of inks required to avoid a grainy image.

Accordingly, pursuant to the invention, the stationary reservoirs 64, 66, 68 and 70 connected to the printhead 20 contain conventional, high-density black, magenta, cyan and yellow inks, respectively, which are, in turn, supplied to the onhead reservoirs, 48, 50, 52 and 54 in the printhead 20 for selective ejection from corresponding groups of 40 orifices 58 in the orifice plate 56 during the printing operation and three of the four stationary reservoirs 72, 74, 76 and 78 connected to the printhead 22 are supplied with low-density black, magenta and cyan inks, respectively. It has been found that, because the eye is less sensitive to density variations of yellow and cannot detect yellow dots of full density which are of the size required to produce high resolution images i.e., less than about 0.04 mm. in diameter, it is not necessary to use low density yellow ink in order to provide high-quality images having continuous tone characteristics.

Thus, the invention takes advantage of the fact that the visual perception of density gradations of yellow ink is substantially less than that of cyan, magenta and black inks in order to enhance the quality of a color image without increasing the total number of inks required or the complexity of the printing system. In one example, the fourth reservoir connected to the printhead 22, instead of providing low density yellow ink, is utilized for a special color, such as red or green, which might otherwise require a combination of the standard subtractive colors, or a specific hue which may be used frequently in the printing operation. Alternatively, the fourth reservoir of that set may be supplied with black ink of even lower density than the black ink in the other reservoir in order to enhance the range of available densities.

In another alternative embodiment, the four reservoirs connected to the printhead 20 supply yellow ink and black inks of three different density levels and the four reservoirs connected to the printhead 22 supply cyan and magenta inks at two different density levels. This reduces the drop positioning errors in placing high and low density inks of the same color adjacent to each other.

For high quality image reproduction, each ink drop applied to the substrate 24 must be deposited at precisely the required position and, to accomplish this, any error in the location of the printhead orifices with respect to the required position must be kept below about 0.005 mm. More-over, the printhead 22 must be positioned on the carriage so as to apply ink drops to exactly the same locations on the substrate sheet 24 as those to which drops may be applied from the printhead 20, either in combination with drops from the printhead 20 or in place of drops from printhead 20 depending upon the selective activation signals supplied through the line 60 from the control unit 44.

In order to make certain that the printhead orifices are properly positioned, the carriage 18 includes, as schematically illustrated in FIG. 3, an angular printhead adjustment 84 for adjusting the sabre angle of each of the printheads 20 and 22 and a lateral spacing adjustment 86 to adjust the axial spacing of the heads with respect to each other. In a preferred embodiment, the sabre angle is zero and the spacing between the last of the orifices 58 in the printhead 20 and the first of the orifices 58 in the print-head 22 is set at 64 image pixels. If a sabre angle other than zero is used, the control unit 44 should be programmed to time the drop ejection pulses to compensate for differing drop path lengths due to the curvature of the drum surface, taking the substrate motion into account.

Figure 8:
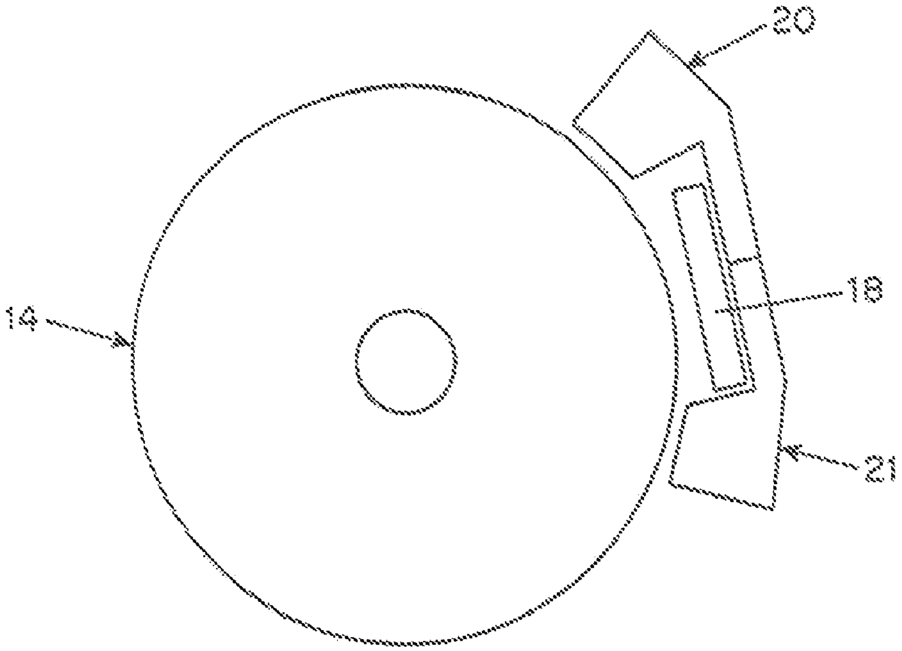
FIG. 8 is a schematic side view showing another embodiment of a printer arranged according to the invention.

It will be understood that, with appropriate modification of the signals from the control unit 44, the printheads 20 and 22 may be spaced in the circumferential direction of the drum rather than in the axial direction as shown schematically in FIG. 8. In this connection it should be noted that, while the physical spacing between orifices in axially spaced printheads must be precisely equal to a unit number of image pixels, the spacing between orifices in angularly spaced printheads need not be equal to a unit number of pixels. To assure proper registration in the circumferential direction, appropriate timing of the pulses from the control unit 44 may be used to compensate for variations in the relative positions of the orifices in the printheads 20 and 22 in the circumferential direction of the drum, regardless of whether the printheads are spaced axially or circumferentially.

In addition, in order to maintain the desired spacing between the substrate 24 and the orifices in the printheads 20 and 22, the carriage 18 is supported on a rail 88 which is affixed near opposite ends on the support plates 30 so as to provide a predetermined spacing between the rail 88 and the drum drive shaft bearings 28 in the support plates 30. The carriage 18 is slidably supported on the carriage support rail 88 by three bearing pads 90 which engage the carriage support rail surfaces and have dimensions which provide predetermined, precisely controlled spacing between the rail 88 and the orifice plate 56 in each of the printheads 20 and 22, the rail surfaces being spaced at a distance from the drum axis which is kept to within about 0.025 mm of the desired value. In order to assure sufficient rigidity of the drum and carriage rail support structure in the angular direction, the support plates 30 are welded to a torsionally stiff, rectangular steel tube 92 about three millimeters thick and having cross-sectional dimensions of about 3.75 cm by 7.75 cm.

As shown in the longitudinal sectional view of FIG. 4, the drum 14 consists of an aluminum cylinder 94 supported at opposite ends from the drive shaft 26 by thermally insulative glass-reinforced plastic end bells 96. After the cylinder 94 and the end bells 96 have been mounted on the shaft 26, the outer drum surface is machined by drum rotation to provide the desired drum diameter, which in a preferred embodiment is approximately 16.4 cm, and to assure uniform spacing of the surface 98 of the drum from the axis of the drive shaft 26. This machining of the assembled drum minimizes runout of the drum surface 98 to 0.1 mm, which is small enough to prevent visual detection of image errors resulting from drum surface runout. With this arrangement, the spacing between the orifice plates 56 of the printheads mounted on the carriage 18 and the surface of the drum 14 can be maintained within about 0.075 mm.

When the printer is used with hot melt inks, the surface 98 of the drum 14 on which the substrate sheet 24 is retained must be maintained at a constant temperature to assure uniform size of the solidified ink drops. For this purpose, a drum heater 100 is mounted outside the drum closely adjacent to the drum surface 98 and is controlled by a temperature detector 102 which engages the surface 98 of the drum outside the image area.

By heating the outer surface 98 of the drum, the necessity for providing slip rings to supply power to a heating device inside the drum is eliminated and more accurate control of the surface temperature is assured. In addition to assure good thermal control and good heat transfer in the axial direction of the drum so as to permit use of a single thermal detector 102 for temperature control at one end of the drum, the thickness of the aluminum cylinder 94 is preferably in the range of about 0.25 to 1.25 cm.

To further facilitate control of the drum surface temperature, the housing 12 is provided with an internal partition 104, containing entrance and exit openings for the sheets 24, which defines a "hot zone" enclosing most of the printer components other than the control unit 44 and the power supply. A thermostatically controlled exhaust fan 106 responsive to a temperature detector 108 mounted on one of the support plates 30, which is representative of the ambient temperature within the hot zone, is arranged to exhaust air from the hot zone whenever the detected temperature exceeds a predetermined value.

It has been found that good steady state control of the temperature of the drum surface 98 at a level of 45°-55° C., for example, can be maintained if the shell of the drum heater 100 is maintained about 5° to 10° C., for example, above the desired temperature of the surface 98. In a representative embodiment, the drum heater 100 has a circumferential dimension equal to about 30-45% of the drum circumference and an axial length approximately equal to that of the drum and the radial spacing of the heater from the drum is about 1-2 mm. For faster drum warmup and precise temperature control, the hot zone within the housing 12 is maintained at a temperature no less than about 10° C. below of the desired temperature of the surface 98, for example at about 35°-45° C.

A supply of substrate material such as sheets of paper 24 is maintained in a supply tray 110 which is received in the lower end of the rear wall of the housing 12. Each sheet 24 is selectively removed from the tray 110 as needed by a friction feed device 112 which advances the top sheet from the supply tray through an opening near the bottom of the partition 104 to a pair of feed rolls 114. With the drum 14 in a stationary position, the sheet 24 is fed against the inclined surface of a baffle 116 which directs the sheet against the drum surface until it is received within a set of lead edge grippers 118 which are actuated in a conventional manner by internal cams (not shown) within the drum 14 so as to be raised away from the drum surface until the sheet 24 is properly positioned. Thereafter, the grippers 118 are closed to clamp the lead edge of the sheet to the drum surface and the drum is rotated in the direction indicated by the arrow 16 and the sheet is held tightly against the drum by a roll 119 until a set of tail edge grippers 120 is in position to receive and clamp the trailing edge of the sheet 24 against the drum surface. In order to assure good image quality the sheet must be held in intimate contact with the drum surface while the image is printed.

Figure 1:
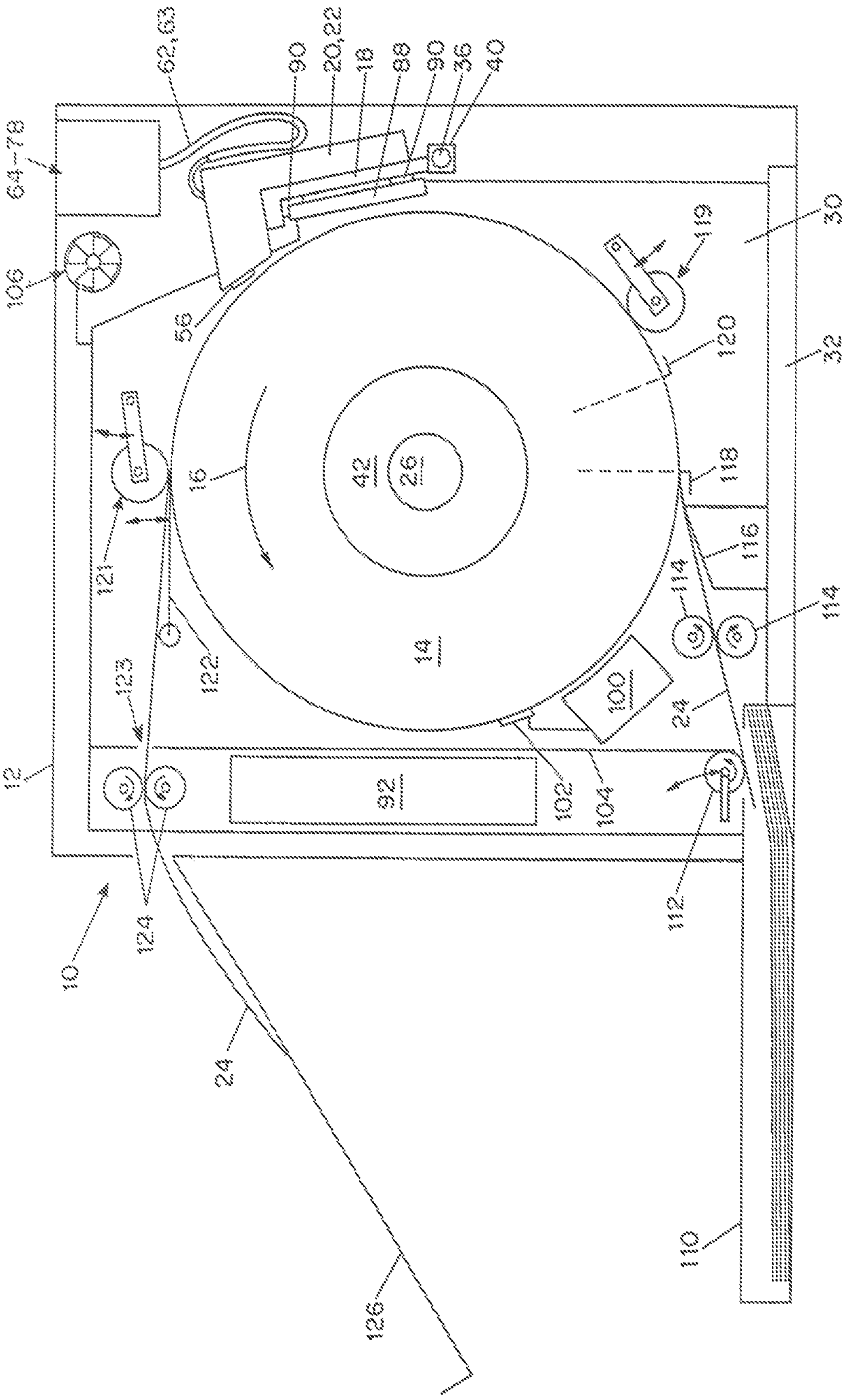
FIG. 1 is a schematic side view illustrating the arrangement of a representative embodiment of a high resolution ink jet printer in accordance with the invention.

After an image has been printed on the sheet 24, the lead edge grippers 118 are raised to release the lead edge of the sheet and a set of stripper rolls 121 and sheet strippers 122, shown in FIG. 1, are moved against the drum surface to strip the sheet 24 from the drum and direct it through an opening 123 near the top of the partition 104. To avoid damage to the image on the sheet 24, the stripper rolls 121, which have a diameter of about 2.5 cm. and are urged with a low force of about 180 gm\cm of roll width, are made of resilient rubber or similar material having a low modulus i.e. a durometer of less than about 35 and preferably less than 25, covered by a sleeve of inert material such as polytetrafluoroethylene. The combination of large roll diameter, low modulus, and low substrate engaging force prevents marring of the ink images on the substrate.

A pair of outfeed drive rolls 124 receive the sheet outside the opening 123 in the partition 104 and convey it to an output tray 126, the trailing edge of the sheet 24 being released by the grippers 120 after the sheet has been captured by the outfeed rolls 124. Since the outfeed rolls 124 are located outside the hot zone, the image on the sheet 24 has cooled sufficiently by the time it reaches them to prevent any disturbance of the image as it passes between them.

On startup and periodically during operation of the printer, for example after every 20 or 30 prints have been made, the carriage 18 is automatically driven to the left end of the support rail 88 as seen FIG. 2, where the printheads 20 and 22 are positioned adjacent to a maintenance station 128. At the maintenance station, the orifice plates 56 are cleaned by wiping with a web of paper as described, for example, in the Spehrley, Jr. et. al. U.S. Pat. No. 4,928,210, the disclosure of which is incorporated herein by reference. In addition, any necessary purging of the printheads is carried out at the maintenance station in the manner described in that patent and in the Hine et. al. U.S. Pat. No. 4,937,598, the disclosure of which is also incorporated herein by reference. For this purpose the supply lines 62 and 63 may also include an air pressure conduit supplying air at elevated pressure to each printhead.

In order to minimize the visual effect of dot position errors which may be related to errors in the position of the printhead in the direction parallel to the axis of the drum, the control unit 44 transmits signals to the printheads which cause them to print images using an interlace technique. In an interlace arrangement, ink is ejected during each drum rotation from orifices 58 in each head which are spaced from each other rather than from adjacent orifices. Typical ink jet interlace techniques are described, for example, in the Hoisington et. al. U.S. Pat. No. 5,075,689, the disclosure of which is incorporated herein by reference.

Figure 9:
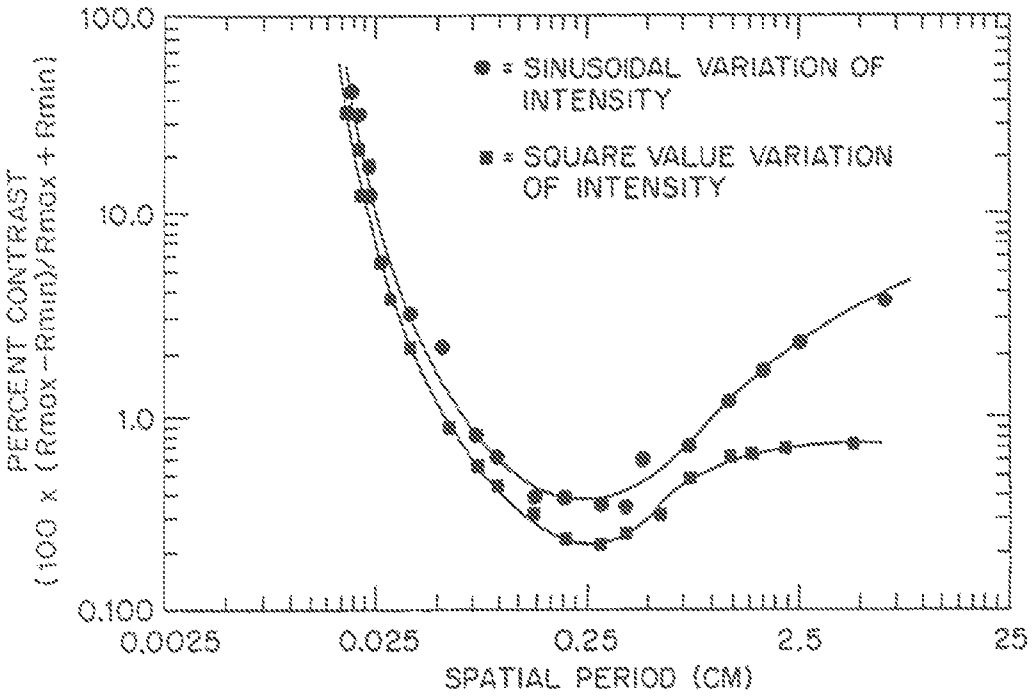
FIG. 9 is a graphical illustration showing which the Banderly curve representing the variation in the lower limit of visual detectability of adjacent bands in an image with respect to the spacing of the bands and density differences between the bands.
Figure 10:
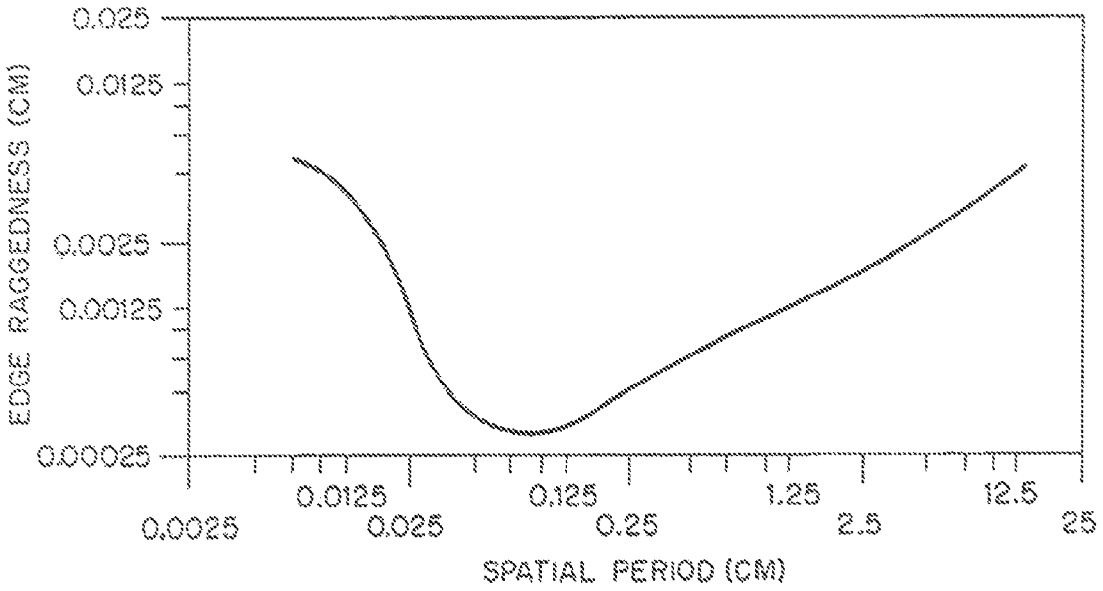
FIG. 10 is a graphical illustration showing the Hammerly curve which represents the lower limit of visual detectability of edge raggedness with respect to image pixel spacing.

From the Banderly and Hammerly curves shown in FIGS. 9 and 10 it can be shown that the visual effects of banding which can occur, for example, with a continuous gradation of drop size with orifice position in an array of orifices, and the edge raggedness which can occur, for example, if alignment of the array orifices is inaccurate, can be minimized by using an interlaced printing technique. Interlaced patterns are obtained in accordance with the present invention when the number of orifices in a given array and the number of image pixels between orifices used in any given scan of the image substrate have no common divisor. Preferably, the orifices which eject ink drops orifice in each color array in the printheads 20 and 22 during any scan are spaced by approximately 0.47 mm. In a high-resolution system this may be accomplished in many ways. For example, the orifices which are actuated during any given scan of a 40-orifice array may be spaced by eleven image pixels, which provides a resolution in the subscanning axial direction i.e., the direction parallel to the drum axis, of 232.3 dots/cm., or, for an array having 35 to 39 orifices, by thirteen image pixels which provides resolution in that direction of 274.4 dots/cm. For an array having 37 orifices, the spacing between orifices activated during any scan may be twelve image pixels, providing resolution of 253.5 dots/cm. and for a 39-orifice array, the orifices actuated during any scan may be spaced by fourteen image pixels, which provides subscanning direction resolution of 295.7 dots/cm. Certain of these arrangements may be more effective than others in avoiding visual effects of drop positioning errors.

In a typical printer arranged according to the invention, in which the encoder 42 generates 1000 pulses per drum rotation and the control unit produces selective actuation pulses at a rate of 13,000 per drum rotation, and in which the drum diameter in 16.4 cm., the resolution is the circumferential direction of the drum is 252.6 dots/cm. with that drum diameter, a substrate sheet having dimensions of about 35.5 cm. by 50 cm. can be accommodated and high-resolution multicolor continuous images about having a size as large as 35 cm. by 49 cm. can be printed. With a drum speed of about 60 rpm, the images can be printed at a rate of about ten per hour.

In a printer of the type described above in which the printhead is advanced continuously as the drum rotates, the resulting image will have a trapezoidal shape which is very slightly skewed from rectangular, by 1.7 mm in a height of 355 mm, which is not easily noticed. If desired, this can be corrected by appropriate programming of the control unit 44 to preconfigure the image by the same skewed amount in the opposite direction.

Alternatively, the carriage 18 may be indexed intermittently rather than continuously by a servomotor, which replaces the coupling between the lead screw and the drum-drive motor 34. In that case, the servomotor is actuated to advance the printhead by a distance in pixels corresponding to the number of orifices in each color array by turning the lead screw preferably one revolution during the interval between the tail edge and the lead edge of the sheet 24 as the drum 14 rotates. With a separate servometer drive arrangement, the servometer can be controlled during printing directly from the encoder output through the line 47 and the carriage 18 can be returned at high speed after completing the printing of an image while the drum is stationary or turning at a low speed to permit unloading and of the sheets 24 on the drums.

Although the invention has been described herein with reference to specific embodiments many modifications and variations therein will readily occur to those skilled in the art. Accordingly, all such variations and modifications are included within the intended scope of the invention.

What is claimed is:

1. A method of printing a variable tonal range on a substrate, the method comprising:

ejecting a drop of a first hot melt ink on a first pixel on the substrate, the first hot melt ink having a first subtractive color and a first density level;

ejecting a drop of a second hot melt ink on the first pixel, the second hot melt ink having a second subtractive color and a second density level;

ejecting a drop of a third hot melt ink on a second pixel on the substrate, the third hot melt ink having a first subtractive color and a third density level that differs from the first density level; and ejecting a drop of a fourth hot melt ink on the second pixel, the fourth hot melt ink having the second subtractive color and a fourth density level that differs from the second density level.

2. The method of claim 1, further comprising mounting the substrate on a rotatable printer drum, the drum being disposed to intercept ink drops ejected by a print head.

3. The method of claim 1, further comprising:

receiving selective actuation signals from a control unit; and determining locations for the first pixel and the second pixel on the substrate at least in part based on the selective actuation signals.

4. The method of claim 1, wherein the first hot melt ink is selected from a set of hot melt inks including at least a pair of black inks, each having a different density level;

a pair of magenta inks, each having a different density level;

a yellow ink; and a pair of cyan inks, each having a different density level.

5. The method of claim 1, wherein at least one of the first subtractive color and the second subtractive color is selected from a set of black inks, each having a density level that differs from all other inks in the set of black inks;

a set of magenta inks, each having a density level that differs from all other inks in the set of magenta inks;

a yellow ink; and a set of cyan inks, each having a density level that differs from all other inks in the set of cyan inks.

6. The method of claim 1, further comprising:

receiving a pulse signal having a first pulse repetition frequency corresponding to a selected image parameter; and controlling ejection of ink drops on the substrate based on the pulse signal.

7. The method of claim 6, further comprising selecting the first pulse repetition frequency to be a function of a rate of rotation of a printer drum.

8. The method of claim 6, wherein the selected image parameter is image pixel resolution.

9. The method of claim 1, further comprising:

receiving a pulse signal having a first pulse repetition frequency corresponding to a desired image pixel resolution;

generating, based on the pulse signal, an ink jet actuation signal having a second pulse repetition frequency, the second pulse repetition frequency being in excess of the first pulse repetition frequency; and controlling ejection of ink drops on the substrate based on the ink jet actuation signal.

10. The method of claim 1, wherein the first hot melt ink is selected from a set of hot melt inks including at least three black inks, each of which has a different density level;

two magenta inks, each of which has a different density level;

two cyan inks, each of which has a different density level; and one yellow ink.

11. The method of claim 1, further comprising selecting at least one of the first hot melt ink, the second hot melt ink, the third hot melt ink and the fourth hot melt ink based on a measure of spatial periodicity.

12. The method of claim 1, wherein at least one of the first hot melt ink, the second hot melt ink, the third hot melt ink and the fourth hot melt ink is a predetermined combination of at least two standard subtractive colors.

13. The method of claim 1, further comprising:

positioning a substrate on an outer surface of a drum, the drum being rotatable around a drum axis;

rotating the drum at a drum-rotation rate;

causing a print-head to translate in a direction parallel to the drum axis and at a rate that depends on the drum-rotation rate;

supplying ink to each of a plurality of orifices on the print-head;

providing a train of signals at a rate that depends on the drum-rotation rate; and selectively ejecting print drops from each orifice for deposition at a predetermined location on the substrate.

14. A method of printing on a substrate with a variable tonal range, the method comprising:

providing a print head for:

ejecting a drop of a first hot melt ink on a first pixel on the substrate, the first hot melt ink having a first subtractive color and a first density level;

ejecting a drop of a second hot melt ink on the first pixel, the second hot melt ink having the first subtractive color and a second density level that differs from the first density level;

ejecting a drop of a third hot melt ink on a second pixel on the substrate, the third hot melt ink having a second subtractive color and a third density level; and ejecting a drop of a fourth hot melt ink on the second pixel, the fourth hot melt ink having the second subtractive color and a fourth density level that differs from the third density level.

15. The method of claim 14, further comprising mounting the substrate on a rotatable printer drum, the drum being disposed to intercept ink drops ejected by a print head.

16. The method of claim 14, further comprising:

receiving selective actuation signals from a control unit; and determining locations for the first pixel and the second pixel on the substrate at least in part based on the selective actuation signals.

17. The method of claim 14, wherein the first hot melt ink is selected from a set of hot melt inks including at least a pair of black inks, each having a different density level;

a pair of magenta inks, each having a different density level;

a yellow ink; and a pair of cyan inks, each having a different density level.

18. The method of claim 14, further comprising:

receiving a pulse signal having a first pulse repetition frequency corresponding to a desired image pixel resolution; and controlling ejection of ink drops on the substrate based on the pulse signal.

19. The method of claim 14, further comprising dynamically varying the first pulse repetition frequency.

20. The method of claim 14, wherein the first hot melt ink is selected from a set of hot melt inks including at least three black inks, each of which has a different density level;

two magenta inks, each of which has a different density level;

two cyan inks, each of which has a different density level; and one yellow ink.

* * * * *